United States Patent
Chen (10) Patent No.: US 10,325,009 B2
(45) Date of Patent: Jun. 18, 2019

(54) METHOD AND APPARATUS FOR USING CUSTOM COMPONENT PARSING ENGINE TO PARSE TAG OF CUSTOM COMPONENT

(71) Applicant: Alibaba Group Holding Limited, Grand Cayman (KY)

(72) Inventor: Wenhong Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/587,078

(22) Filed: May 4, 2017

(65) Prior Publication Data

US 2017/0329746 A1 Nov. 16, 2017

(30) Foreign Application Priority Data

May 12, 2016 (CN) .......................... 2016 1 0312934

(51) Int. Cl.
G06F 17/21 (2006.01)
G06F 17/22 (2006.01)
G06F 17/27 (2006.01)
G06F 16/958 (2019.01)

(52) U.S. Cl.
CPC .......... *G06F 17/212* (2013.01); *G06F 16/986* (2019.01); *G06F 17/218* (2013.01); *G06F 17/2247* (2013.01); *G06F 17/2705* (2013.01)

(58) Field of Classification Search
CPC .......... G06F 17/21; G06F 17/27; G06F 17/22
See application file for complete search history.

(56) References Cited

U.S. PATENT DOCUMENTS

| 6,981,212 B1 * | 12/2005 | Claussen ........... G06F 17/30896 707/E17.118 |
| 7,089,330 B1 * | 8/2006 | Mason .............. G06F 17/30876 707/999.005 |
| 7,219,350 B2 | 5/2007 | Bhogal et al. |
| 7,546,576 B2 | 6/2009 | Egli |
| 2003/0051001 A1 | 3/2003 | Calvo et al. |
| 2005/0160358 A1 * | 7/2005 | Gumz ................. G06F 9/44526 715/234 |
| 2005/0198577 A1 * | 9/2005 | Presler-Marshall ...... G06F 8/52 715/748 |

(Continued)

OTHER PUBLICATIONS

The PCT Search Report and Written Opinion dated Jul. 6, 2017 for PCT Application No. PCT/US2017/031064, 7 pages.

*Primary Examiner* — Asher D Kells
(74) *Attorney, Agent, or Firm* — Lee & Hayes, P.C.

(57) ABSTRACT

A page component dynamic layout method includes: initiating, by a client terminal, a page content request to a server based on a triggered request page; querying, by the client terminal, whether there is a preset identifier in a page response content; if there is a preset identifier in the page response content, loading a set custom component parsing engine to parse a tag of a custom component; selecting, by the client terminal, a corresponding custom component according to tag information obtained by parsing the tag of the custom component, and calling a set custom component rendering engine to render the custom component; and adding the rendered custom component to a corresponding position of the request page. Dynamic layout of a Native component on a WebView is achieved on an HTML page, thereby improving the convenience of laying out pages by an operator.

20 Claims, 5 Drawing Sheets

(56) References Cited

U.S. PATENT DOCUMENTS

| | | | |
|---|---|---|---|
| 2007/0101322 A1* | 5/2007 | Muschett | G06F 9/44526 |
| | | | 717/168 |
| 2009/0287990 A1 | 11/2009 | Lynton et al. | |
| 2010/0095197 A1* | 4/2010 | Klevenz | G06F 17/2247 |
| | | | 715/234 |
| 2012/0137211 A1* | 5/2012 | Lewontin | G06F 17/227 |
| | | | 715/236 |
| 2013/0073945 A1 | 3/2013 | Bingell et al. | |
| 2013/0212487 A1 | 8/2013 | Cote | |
| 2014/0136954 A1 | 5/2014 | Ligman et al. | |
| 2014/0201131 A1* | 7/2014 | Burman | G06F 17/30722 |
| | | | 707/608 |
| 2014/0281904 A1* | 9/2014 | Burckart | G06F 17/30893 |
| | | | 715/234 |
| 2015/0067030 A1 | 3/2015 | Smith et al. | |
| 2015/0161277 A1* | 6/2015 | Heller | G06F 9/44526 |
| | | | 715/229 |
| 2015/0193425 A1* | 7/2015 | Kusumura | G06F 17/27 |
| | | | 704/9 |
| 2016/0103923 A1* | 4/2016 | Thomas | G06F 17/218 |
| | | | 715/234 |
| 2017/0031869 A1* | 2/2017 | Franczyk | G06F 17/2247 |
| 2017/0132182 A1* | 5/2017 | Manion | G06F 17/2247 |

\* cited by examiner

METHOD AND APPARATUS FOR USING CUSTOM COMPONENT PARSING ENGINE TO PARSE TAG OF CUSTOM COMPONENT

CROSS REFERENCE TO RELATED PATENT APPLICATIONS

This application claims priority to Chinese Patent Application No. 201610312934.8, filed on May 12, 2016, entitled "PAGE COMPONENT DYNAMIC LAYOUT METHOD, APPARATUS AND CLIENT TERMINAL," which is hereby incorporated by reference in its entirety.

TECHNICAL FIELD

The present disclosure relates to the field of computer data processing technologies, and, in particular, to page component dynamic layout methods, apparatuses and client terminals.

BACKGROUND

With the increasing rise of the mobile Internet, users' demands relating to reading news, watching video, online shopping, instant messaging and so on through a Web page of an application (APP) on a mobile terminal device, such as a mobile phone or a tablet, are becoming increasingly complex and diverse. Rapid iteration of the APP becomes a severe test faced by a great number of APP mobile manufacturers; therefore, in the field of mobile APP development, dynamic technologies have become the focus of development and research of a number of APP mobile manufacturers.

In the current field of mobile APP development, a dynamic technology that achieves page dynamic layout mainly employs a WebView component, which can make use of a mature and complete WebKit open source kernel to achieve a browser function of a client terminal. As stated above, in order to meet user demands and enhance user experience, at present, a number of open APPs no longer use a WebView component, but have begun using a ReactNative technology similar to Facebook to achieve page dynamic layout. The React Native breaks away from the concept of the conventional Hybrid App, and redefines a set of rules based on HTML, CSS, and JavaScript. In JavaScript, it is possible to use a native UI component of a React abstract operating system to replace a DOM element for rendering. For example, <div> is replaced with <View>, <img> is replaced with <Image>, and so on. In terms of UI, the React Native provides a cross-platform layout system similar to Flexbox, and further supports a CSS subset, and in addition, it may also use a JSX or ordinary JavaScript language as well as CoffeeScript and TypeScript to develop mobile terminal APPs.

The ReactNative technology provides a large number of React Native open source components, for example, forms, video cameras, navigation controls, and so on, and can provide mobile application developers with help. At present, applications on the market mostly use technologies similar to the ReactNative for dynamic layout, which mainly include: compiling a ReactNative layout page by using a React.js (Web platform) technology, then parsing the page through a react-Native.js parsing engine, and finally completing layout of the page through a parsing engine of a Native layer.

At present, the HTML page stills occupies an important position in the mobile terminal page; however, implementation of such a ReactNative dynamic technology does not conform to a W3C standard, which completely achieves grammar, parsing and other steps independently. Such method is not compatible with the existing WebKit kernel, and cannot open the existing page (for example, directly open Baidu and google pages); moreover, implementation of the technology requires a higher learning cost for page developers, and cannot use the original HTML technology to achieve dynamic layout of the Native component on the WebView.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of the present disclosure is to provide a page component dynamic layout method, apparatus and client terminal, which, through a tag of a Native custom component on the basis of an HTML page, completes rendering of a Native component on the HTML page, and achieve dynamic layout of the Native component on the WebView, thus solving the technical problem in the conventional techniques that the dynamic layout of Native component cannot be achieved on the HTML page, and greatly improving the convenience of laying out pages by an operator.

The present disclosure provides a page component dynamic layout method, apparatus and client terminal, which are implemented as follows.

The present disclosure provides a page component dynamic layout method, including:

initiating, by a client terminal, a page content request to a server based on a triggered request page;

determining, by the server, upon receipt of the page content request, whether the request page includes a tag of a custom component; and if yes, setting a preset identifier in a page response content returned to the client terminal;

opening, by the client terminal, the request page according to the received page response content, and querying whether there is a preset identifier in the page response content; and if there is a preset identifier in the page response content, loading a set custom component parsing engine to parse the tag of the custom component in the request page;

selecting, by the client terminal, a corresponding custom component according to tag information obtained by parsing the tag of the custom component, and calling a set custom component rendering engine to render the custom component; and adding, by the client terminal, the rendered custom component to a corresponding position of the request page.

The present disclosure provides a page component dynamic layout method, including:

initiating a page content request to a server based on a triggered request page;

opening the request page based on a received page response content returned by the server, and querying whether there is a preset identifier in the page response content;

if there is a preset identifier in the page response content, loading a set custom component parsing engine to parse a tag of a custom component in the request page;

selecting a corresponding custom component according to tag information obtained by parsing the tag of the custom component, and calling a set custom component rendering engine to render the custom component; and adding the rendered custom component to a corresponding position of the request page.

For example, the method may further comprise determining, by the server, that the request page includes a tag of a custom component upon receipt of the page content request.

For example, the method may further comprise setting the preset identifier in the page response content returned to the client terminal in response to determining that the request page includes the tag of the custom component.

For example, the parsing the tag of the custom component in the request page includes: extracting information of the tag of the custom component in the request page; and determining the set custom component rendering engine corresponding to the tag information according to the extracted information.

For example, the triggered request page is an HTML page of a terminal application, the custom component includes a Native component, and the set custom component parsing engine includes a Native component parsing engine core.js.

The present disclosure provides a page component dynamic layout method, including:

sending the parsing information of a user-defined set custom component to a custom component parsing engine of a client terminal; and returning a corresponding page response content according to a received page content request of the client terminal; and if it is determined that a tag of the custom component is used in a request page of the client terminal, setting a preset identifier in the page response content returned to the client terminal.

For example, the returning the corresponding page response content according to the received page content request of the client terminal includes: determining that a tag of the custom component is used in a request page of the client terminal; and setting a preset identifier in the page response content returned to the client terminal.

For example, the triggered request page is an HTML page of a terminal application, the custom component includes a Native component, and the set custom component parsing engine includes a Native component parsing engine core.js.

The present disclosure provides a page component dynamic layout apparatus, including:

a page request module configured to initiate a page content request to a server based on a triggered request page;

a receiving and processing module configured to receive a page response content returned by the server, open the request page according to the page response content, and query whether there is a preset identifier in the page response content;

a page parsing module configured to, if it is found that there is a preset identifier in the page response content, load a set custom component parsing engine to parse a tag of a custom component in the request page;

a page rendering module configured to select a corresponding custom component according to tag information obtained by parsing the tag of the custom component, and call a set custom component rendering engine to render the custom component; and a dynamic layout module configured to add the rendered custom component to a corresponding position of the request page.

For example, the page parsing module is further configured to extract information of the tag of the custom component in the request page, and determine the set custom component rendering engine corresponding to the tag information according to the extracted information.

For example, the triggered request page is an HTML page of a terminal application, the custom component includes a Native component, and the set custom component parsing engine includes a Native component parsing engine core.js.

The present disclosure provides a page component dynamic layout apparatus, including:

a custom component module configured to store a user-defined and set custom component and parsing information of the custom component, and send the parsing information to a custom component parsing engine of a client terminal; and a page request processing module configured to return a corresponding page response content according to a received page content request of the client terminal; and if it is determined that a tag of the custom component is used in a request page of the client terminal, set a preset identifier in the page response content returned to the client terminal.

The present disclosure provides a page browsing client terminal, including:

a first processing unit configured to initiate a page content request to a server based on a triggered request page; and further configured to receive a page response content returned by the server, open the request page according to the page response content, and render the request page according to the page response content; and a second processing unit configured to load a set custom component parsing engine to parse a tag of a custom component in the request page; further configured to select a corresponding custom component according to tag information obtained by parsing the tag of the custom component, and call a set custom component rendering engine to render the custom component; and further configured to add the rendered custom component to a corresponding position of the request page.

For example, the custom component may refer to self-defined component and custom component rendering engine may refer to self-defined component rendering engine.

The debugging method, apparatus and client terminal for terminal application page provided in the present disclosure achieve dynamic layout of a Native component on a WebView by customizing a tag of the Native component on the basis of an HTML page. An operator may design and add a tag of a Native custom component in a web page browsed by a user, and, at a page server side, information of a preset custom component is extracted, and CSS-Layout, data, events and so on are calculated to obtain parsing information of the Native custom component. In this way, if a request page initiated by the user includes a tag of the custom component, the page server may set an identifier on a page response content of the request page. Correspondingly, if the client terminal WebView finds the identifier after opening the HTML page, a Native component parsing engine may be injected to complete parsing of CSS-Layout, data, events and other information. Then, a platform related rendering engine module may be called to render the Native component at the client terminal, and the rendered component may be directly added to the original WebView, to complete dynamic layout of the Native component of the request page. The implementation solution of the present disclosure achieves adding a tag of a Native component on the HTML page and replacing the original tag of the HTML with a Native rendered component on the page browsed by the user, thus achieving better page dynamic layout practice while maintaining non-intrusion into the WebView, so that the HTML language based page component dynamic layout can greatly improve the convenience of the operator.

BRIEF DESCRIPTION OF THE DRAWINGS

In order to describe the technical solutions in the example embodiments of the present disclosure or the conventional techniques more clearly, accompanying drawings needed for describing the example embodiments are introduced briefly in the following. It is apparent that the accompanying drawings in the following description are only example embodiments described in the present disclosure.

DETAILED DESCRIPTION

In order to enable those skilled in the art better understand the technical solution in the present disclosure, the technical solution in the example embodiments of the present disclosure will be clearly and completely described below with reference to the accompanying drawings in the example embodiments of the present disclosure. The example embodiments to be described merely represent a part rather than all of the embodiments of the present disclosure. All other example embodiments derived by those of ordinary skill in the art based on the example embodiments of the present disclosure without making any creative efforts should fall within the protection scope of the present disclosure.

Figure 1:
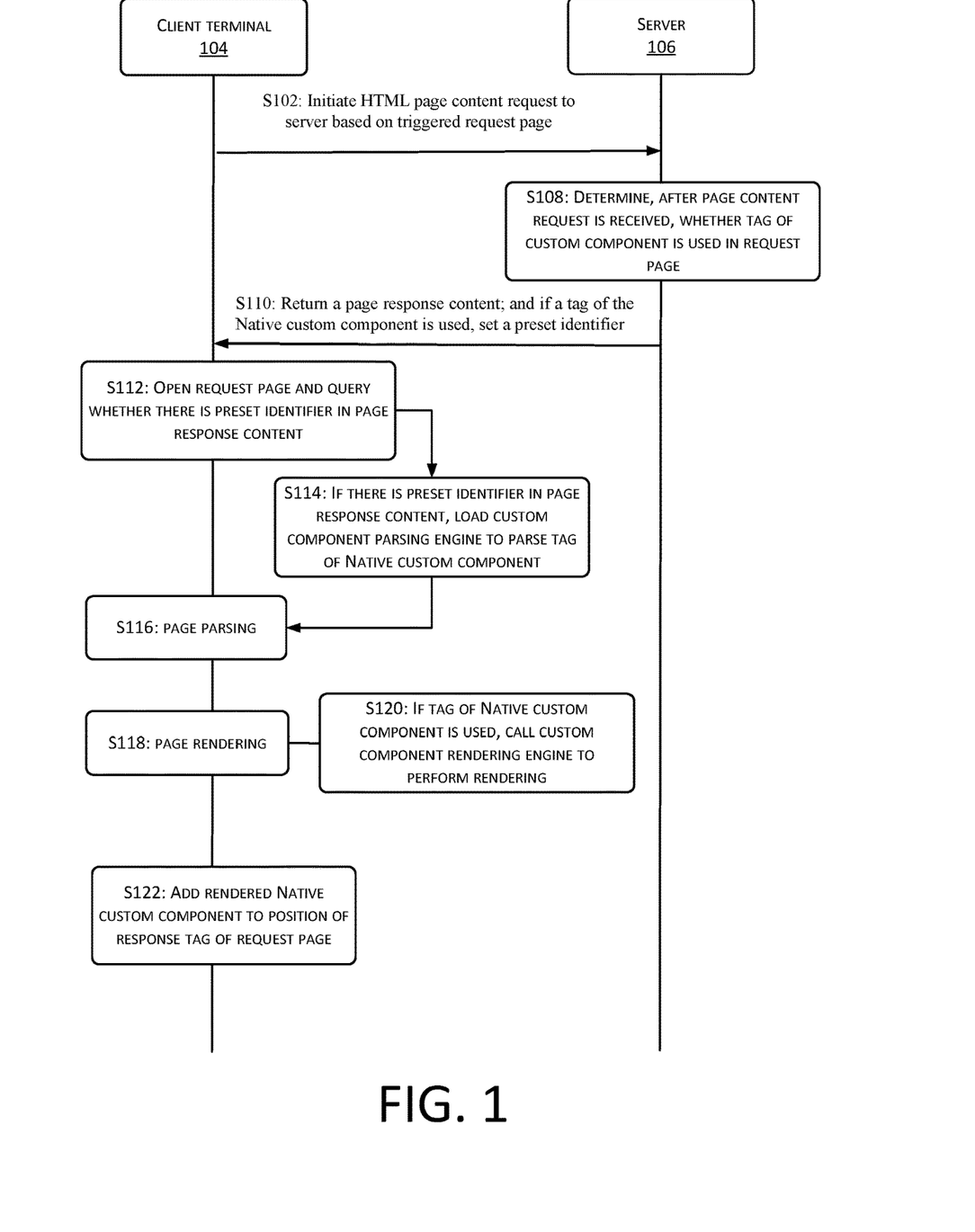
FIG. 1 is a schematic method flowchart of an example embodiment of a page component dynamic layout method according to the present disclosure.

The page component dynamic layout method, apparatus and client terminal in the present disclosure are described below in detail with reference to the accompanying drawings. FIG. 1 is a schematic method flowchart of an example embodiment of a page component dynamic layout method according to the present disclosure. Although the present disclosure provides the operation steps of the method or the structure of the apparatus as shown by the following example embodiments or figures, the method or apparatus may include more or fewer operation steps or module structures based on the conventional or non-creative efforts. In steps or structures without necessary causal relationships in logic, the execution sequence of the steps or the module structure of the apparatus are not limited to the execution sequence or the module structure provided in the example embodiments of the present disclosure. The method or module structure, when executed in an actual apparatus or terminal product, may be executed sequentially or executed in parallel (for example, in a parallel processor environment or multi-thread processing environment) according to the method or module structure connection shown in the example embodiment or the accompanying drawings.

For example, as shown in FIG. 1, an example embodiment in a page component dynamic layout method according to the present disclosure may include:

S102: A client terminal 104 initiates a page content request to a server 106 based on a triggered request page.

When a user clicks an online or offline HTML page at a client terminal, the client terminal 104 may enter a WebView page, and initiate, to the server 106, a page content request by the user. The page request may be triggered in an application (APP) in the client terminal 104, for example, an online shopping APP. The client terminal 104 in the present disclosure may include a mobile terminal that uses a system such as iOS, Android or YunOS, and may include, but not limited to, a mobile communication terminal, a PDA, a tablet, a POS machine, an on-board computer, and so on. Certainly, non-mobile terminals that implement the solution of the present disclosure, for example, self-service terminals capable of page browsing, PC computers and the like, also fall within the scope of the client terminal according to the present disclosure.

Generally, the page content request initiated by the client terminal 104 may include, for example, page data, page layer structures, event information and so on. If the request page triggered by the user includes a page component, the corresponding page request content may include related information of the page component, for example, message exchange content of the page component and the server, the name of the page component, the type thereof and other attribute information. The request page of the client terminal 104 in the example embodiment of the present disclosure may include custom tag information that needs to be replaced with a custom component by a designer according to a pre-design, and then the page content request may include related information of using a tag of a custom component. The custom component may include a Native component.

In the example embodiment of the present disclosure, when the user triggers a page of the client terminal, the client terminal may initiate a content request of the page to the server.

S108: The server 106, upon receipt of the page content request, determines whether the request page includes a tag identifying a use of a custom component; and if yes, at S110, sets a preset identifier in a page response content returned to the client terminal 104.

In the implementation solution of the present disclosure, an operator may customize a tag of a Native component. Specifically, for example, a page rendered through a native webkit has a problem of performance or experience in aspects such as a large list and an input box. In this example embodiment, a component tag impossible to be achieved on WebView or considered to have poor performance by the designer can be extracted and grouped, and abstracted to a custom Native component tag, for example, ListView. The designer can develop and design all available custom component tags in advance.

In the example embodiment of the present disclosure, information of the Native custom component may be extracted, which may specifically include: before page rendering, completing preprocessing of an HTML description file, extracting a tag of the Native custom component, and calculating CSS-Layout, data, events and other information thereof, to form parsing information of the Native custom component. Then, the parsing information of the Native custom component extracted and calculated may be transmitted to a Native component engine.

In this way, a page layout and design operator may lay out and use a tag of a custom component in the page, and a server, upon receipt of the page content request sent by the client terminal, finds whether the tag of the custom component is used in the page content request of the client terminal. If the page requested by the client terminal includes a pre-defined and set tag of the custom component, it is possible to set a preset identifier in the page response content responded to the client terminal by the server. For example, in this example embodiment, a preset identifier, for example, "CustomNativeComponent" may be typed on the head of the page response content returned to the client terminal. Certainly, the preset identifier may be specifically customized by the operator, and can be used for the client terminal to identify the tag of the custom component included in the response to the request page, to facilitate parsing, rendering and other processing on the custom component. The server, after processing the page content request of the client terminal, returns a complete HTML page response content of the request page to the client terminal. In this way, when the WebView of the user client terminal opens the HTML page, it is possible to know according to the identifier in the page response content that it is necessary to parse and render the custom component on the HTML page.

The server, upon receipt of the page content request of the client terminal, determines whether the request page includes and uses the tag of the custom component; and if yes, sets a preset identifier in a page response content returned to the client terminal.

S112: The client terminal 104 opens the request page according to the received page response content, and queries whether there is a preset identifier in the page response content; and, at S114, if there is a preset identifier in the page response content, loads a set custom component parsing engine to conduct page parsing at S116, for example, parsing the tag of the custom component in the request page.

In the example embodiment of the present disclosure, the WebView of the client terminal, upon receipt of the page response content fed back by the server, may open an HTML request page, and at this time, if it is found that there is a preset identifier in the page response content, it may indicate that the opened HTML request page includes a Native custom component. Then, the client terminal may load a parsing engine for parsing the custom component to parse a tag of the Native custom component in the HTML request page. In this example embodiment, if it is found that the preset identifier "CustomNativeComponent" exists in the response head, at this point, the client terminal may inject a Native component parsing engine Core.js to parse the tag of the Native custom component in the request page.

It should be noted that, in the example embodiment of the present disclosure, the parsing may specifically include parsing information of an original custom tag in HTML. In subsequent processing, it is possible to select a corresponding native component according to tag information acquired through parsing. The custom component parsing engine may include core.js, mainly for extracting the custom tag used in the page, and calculating corresponding data thereof. The rendering engine described hereinafter may include a client terminal engine, mainly for rendering the native component of the client terminal according to custom tag information brought back by the engine core.js. Therefore, in this example embodiment, the parsing the tag of the custom component in the request page may include:

extracting information of the tag of the custom component in the request page, to determine that the rendering engine selects tag information of a corresponding custom component.

In this example embodiment, as stated previously, when the Native custom component is defined and set, it is possible to extract tag information of the Native custom component, for example, CSS-Layout, data, events and other information thereof are calculated, to form parsing information of the Native custom component. Then, it is possible to transmit the parsing information of the Native custom component extracted and calculated to the Native component engine. Therefore, the custom component parsing engine loaded by the client terminal may parse the tag of the custom component in the page according to parsing information of the custom component pre-defined and set.

S118: The client terminal 104 conducts page rendering. At S120, if tag of Native custom component is used, the client terminal 104 calls custom component rendering engine to perform rendering. The client terminal 104 selects a corresponding custom component according to tag information obtained by parsing the tag of the custom component, and calls a set custom component rendering engine to render the custom component.

The custom component parsing engine, after parsing the tag of the custom component in the page and completing calculation of CS S-Layout, data, events and so on, can acquire tag information of the tag of the custom component. Then, a custom Native component corresponding to the position of the tag of the custom component may be selected according to the tag information obtained through extraction and calculation, and then a platform related custom component rendering engine is called to render the Native custom component. In this example embodiment, the platform related generally refers to that, for iOS, Android, and the like, the UI component library of the system is different; therefore, rendering engines at iOS and Android terminals have different rendering parts. The custom component rendering engine here can only process a custom tag, and render the custom tag into a native component. As the system webkit has made related rendering processing under normal circumstances, the custom component rendering engine may not process other contents. Certainly, in some other implementations, completing rendering of other contents of the page by using the custom component rendering engine may also be included. The custom component rendering engine may include a Native component dynamic layout engine, which can implement the function of rendering a Native custom component at iOS, Android, and browser terminals.

The client terminal may perform rendering processing on the request page according to the returned page response content, and if it is necessary to render the Native component, call a custom component rendering engine to render the custom component parsed in the request page.

S122: The client terminal 104 adds the rendered custom component to a corresponding position of the request page.

In this example embodiment, after rendering of the Native custom component is completed, the rendered present Native custom component may be directly added to the WebView, thus completing dynamic layout of the present Native custom component. Certainly, the request page may include one or more tags of the Native custom component, the client terminal may parse and render the Native custom components in all the tags respectively by using a parsing engine and a rendering engine.

The example embodiment of the present disclosure may, by adding a tag of the present Native custom component on an HTML page, achieve, on the client terminal, dynamic layout of the Native component based on the WebView through a custom component parsing engine and a rendering engine. The implementation solution of the present disclosure may achieve page component dynamic layout on the HTML page without intruding the WebView, so that the HTML language based page component dynamic layout can greatly improve the convenience of the operator.

Figure 2:
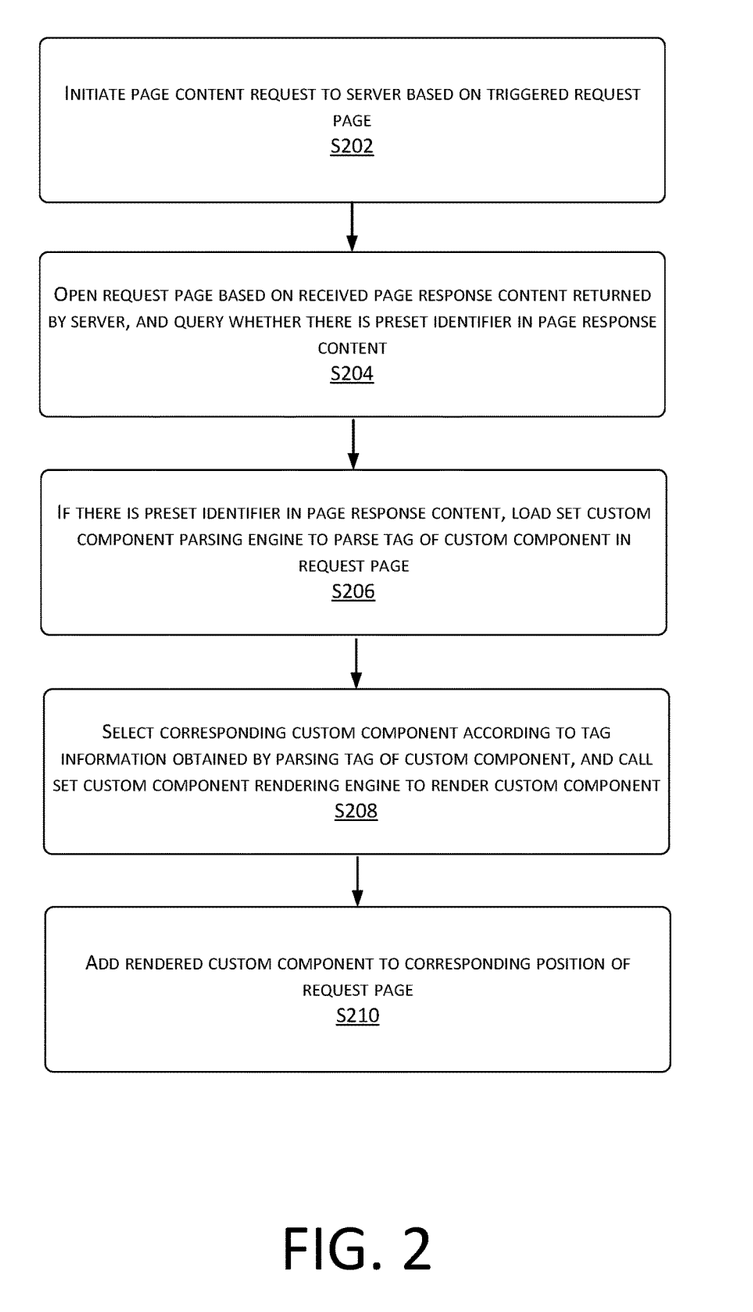
FIG. 2 is a schematic method flowchart of an example embodiment of a page component dynamic layout method according to the present disclosure.

The page component dynamic layout method in the above example embodiment is applicable to dynamic layout of a custom component (including, but not limited to, a Native component) in an HTML page at a client terminal side. Therefore, the present disclosure further provides a page component dynamic layout method implementable at a client terminal. FIG. 2 is a schematic method flowchart of an example embodiment of a page component dynamic layout method according to the present disclosure. Specifically, as shown in FIG. 2, the method may include:

S202: initiating a page content request to a server based on a triggered request page;

S204: opening the request page based on a received page response content returned by the server, and querying whether there is a preset identifier in the page response content;

S206: if there is a preset identifier in the page response content, loading a set custom component parsing engine to parse a tag of a custom component in the request page;

S208: selecting a corresponding custom component according to tag information obtained by parsing the tag of the custom component, and calling a set custom component rendering engine to render the custom component; and S210: adding the rendered custom component to a corresponding position of the request page.

The page component dynamic layout method according to the example embodiment of the present disclosure can be used for page component dynamic layout on the page of the client terminal, and on a page browsed by a user, the original tag in the page that cannot be directly parsed or has poor performance and needs to be modified is replaced with a selected custom component, which can greatly improve the convenience of the operator.

Certainly, in a specific application scenario of the above implementation solution, the triggered request page may include an HTML page of a terminal application triggered by a user in a client terminal, for example, a browser or a designated application (APP). And, before page rendering, an HTML description file may be preprocessed, including extracting information of a tag of a custom Native component, and calculating tag information such as Css-layout and events, and then a custom component engine may parse the custom component based on component information calculated through information extraction. In some example embodiments of performing component dynamic layout based on an HTML page, the custom component may include a Native component, and correspondingly, the set custom component parsing engine may include a Native component parsing engine core.js. The parsing the tag of the custom component in the request page includes: extracting information of the tag of the custom component in the request page, to determine that the rendering engine selects tag information of a corresponding custom component.

Figure 3:
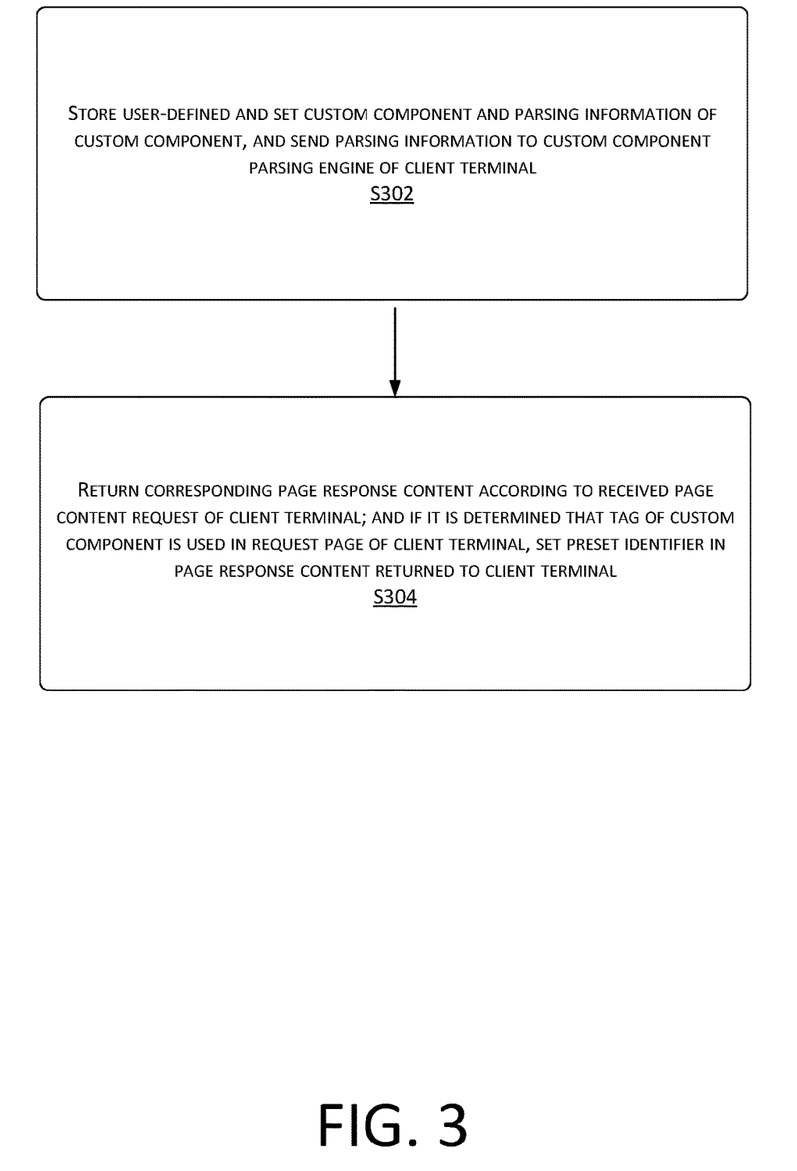
FIG. 3 is a schematic method flowchart of an example embodiment of a page component dynamic layout method according to the present disclosure.

Correspondingly, the present disclosure further provides a page component dynamic layout method applicable to a server side. In the method, the server side may achieve that an operator customizes a Native component, acquires parsing information of the Native component, and transmits the parsing information to a parsing engine of each client terminal. Moreover, in the determination of whether the page content request of the client terminal includes a tag identifying a use of a custom component, an identifier is set correspondingly on the page if yes, to inform the client terminal that it is necessary to load a custom component parsing engine and a rendering engine to process the Native component. FIG. 3 is a page component dynamic layout method according to the present disclosure. As shown in FIG. 3, the method may include:

S302: storing a user-defined and set custom component and parsing information of the custom component, and sending the parsing information to a custom component parsing engine of a client terminal.

For example, when the user-defined and set custom component and the parsing information of the custom component updates, the server sends the parsing information to a custom component parsing engine of a client terminal. Although the present disclosure provides operation steps of the method as described in the example embodiment or the flowchart, more or fewer operation steps may be included. For instance, step S302 is not necessary in some implementations of the present disclosure.

S304: returning a corresponding page response content according to a received page content request of the client terminal; and if it is determined that a tag of the custom component is used in a request page of the client terminal, setting a preset identifier in the page response content returned to the client terminal.

In a page component dynamic layout method applicable to a client terminal or server side according to the above example embodiment, reference may be made to related descriptions of other example embodiments of the present disclosure for the page pre-processing, the custom component type such as the Native component, the specific custom component parsing process, and the like, which are not repeated herein.

Figure 4:
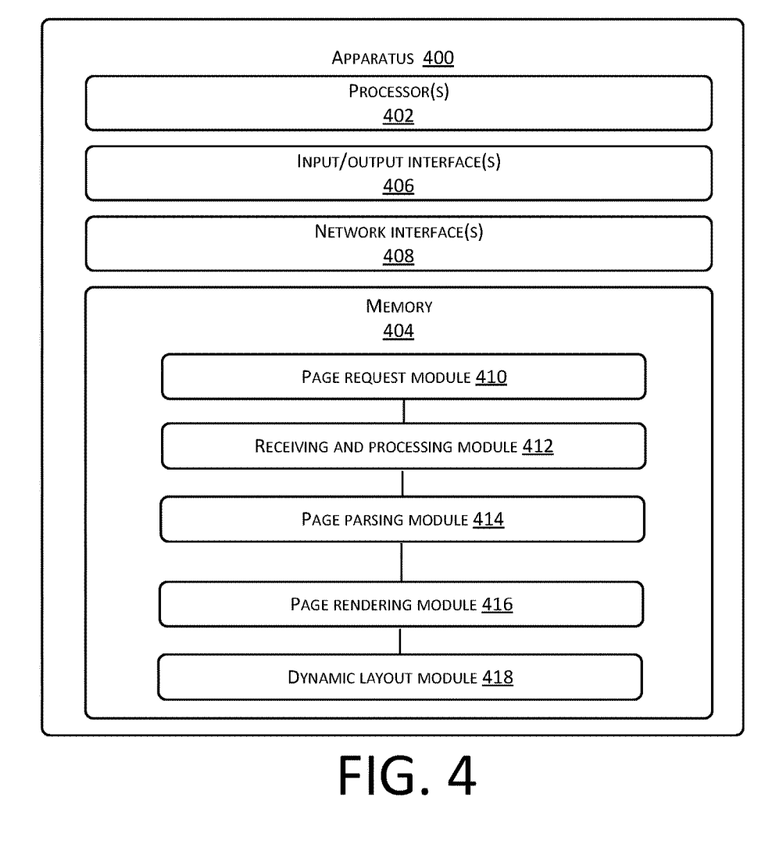
FIG. 4 is a schematic module structural diagram of an example embodiment of a page component dynamic layout apparatus according to the present disclosure.

Based on the page component dynamic layout method according to the present disclosure, the present disclosure provides a page component dynamic layout apparatus. The apparatus is applicable to a client terminal side to achieve dynamic layout of a Native component based on a WebView. FIG. 4 is a schematic module structural diagram of an example embodiment of a page component dynamic layout apparatus according to the present disclosure. As shown in FIG. 4, an apparatus 400 includes one or more processor(s) 402 or data processing unit(s) and memory 404. The apparatus 400 may further include one or more input/output interface(s) 406, and network interface(s) 408. The memory 404 is an example of computer readable media.

The computer readable media include volatile and non-volatile, removable and non-removable media, and can use any method or technology to store information. The information may be a computer readable instruction, a data structure, and a module of a program or other data. Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. According to the definition herein, the computer readable media does not include transitory computer readable media (transitory media), for example, a modulated data signal and a carrier.

The memory 404 may store therein a plurality of modules or units including:

a page request module 410, which can be configured to initiate a page content request to a server based on a triggered request page;

a receiving and processing module 412, which can be configured to receive a page response content returned by the server, open the request page according to the page response content, and query whether there is a preset identifier in the page response content;

a page parsing module 414, which can be configured to, if it is found that there is a preset identifier in the page response content, load a set custom component parsing engine to parse a tag of a custom component in the request page;

a page rendering module 416, which can be configured to select a corresponding custom component according to tag information obtained by parsing the tag of the custom component, and call a set custom component rendering engine to render the custom component; and a dynamic layout module 418, which can be configured to add the rendered custom component to a corresponding position of the request page.

Certainly, the page parsing module and the page rendering module, in addition to being capable of parsing and rendering the custom component, are also capable of calling or loading other engines to correspondingly parse and render the HTML request page.

In an example embodiment of a specific application scenario, as stated previously, the parsing, by a page parsing module 414, the tag of the request page may specifically include:

extracting information of the tag of the custom component in the request page, to determine that the rendering engine selects tag information of a corresponding custom component.

Certainly, in a specific application scenario of the above implementation solution, the triggered request page may include an HTML page of a terminal application triggered by a user in a client terminal, for example, a browser or a designated application (APP). And, before page rendering, an HTML description file may be preprocessed, including extracting information of a tag of a custom Native component, and calculating tag information such as Css-layout and events. In some example embodiments of performing component dynamic layout based on an HTML page, the custom component may include a Native component, and correspondingly, the set custom component parsing engine may include a Native component parsing engine core.js.

Figure 5:
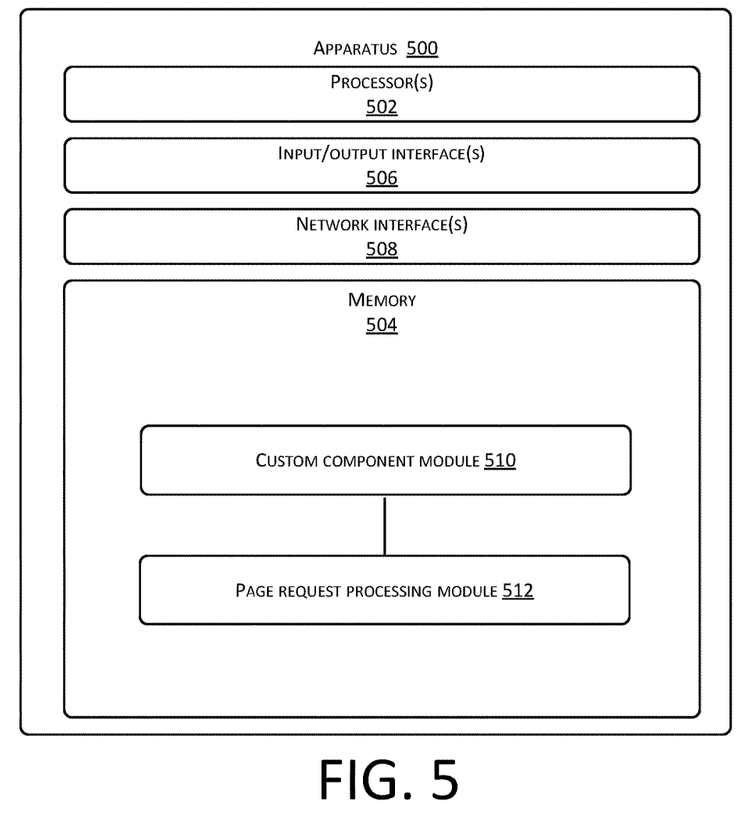
FIG. 5 is a schematic module structural diagram of an example embodiment of a page component dynamic layout apparatus according to the present disclosure.

Based on the page component dynamic layout method according to the present disclosure, the present disclosure provides a page component dynamic layout apparatus. The apparatus is applicable to a server side to achieve dynamic layout of a Native component based on a WebView. FIG. 5 is a schematic module structural diagram of an example embodiment of a page component dynamic layout apparatus according to the present disclosure. As shown in FIG. 5, an apparatus 500 includes one or more processor(s) 502 or data processing unit(s) and memory 504. The apparatus 500 may further include one or more input/output interface(s) 506, and network interface(s) 508. The memory 504 is an example of computer readable media. The memory 504 may store therein a plurality of modules or units including:

a custom component module 510, which can be configured to store a user-defined and set custom component and parsing information of the custom component, and send the parsing information to a custom component parsing engine of a client terminal; and a page request processing module 512, which can be configured to return a corresponding page response content according to a received page content request of the client terminal; and if it is determined that a tag of the custom component is used in a request page of the client terminal, set a preset identifier in the page response content returned to the client terminal.

The apparatus provided in the above example embodiment may, through a tag of a Native custom component on the basis of an HTML page, complete rendering of the Native component on the HTML page, and achieve dynamic layout of the Native component on the WebView, which solves the technical problem in the conventional techniques that the Native component cannot achieve dynamic layout on the HTML page, and greatly improves the convenience of laying out pages by an operator.

As stated previously, the page component dynamic layout method or apparatus according to the present disclosure may be used on a client terminal, for example, a wireless client terminal, to achieve dynamic layout of the Native component based on the WebView in the HTML page layout processing operation. Therefore, the present disclosure further provides a page browsing client terminal, which may include, but not limited to, client terminals using iOS, Android, and YunOS systems, to achieve dynamic layout of the custom Native component on the basis of the HTML page by the browser terminal. Specifically, in a page browsing client terminal according to an example embodiment of the present disclosure, the client terminal may include:

a first processing unit configured to initiate a page content request to a server based on a triggered request page; and further configured to receive a page response content returned by the server, open the request page according to the page response content, and render the request page according to the page response content; and a second processing unit configured to load a set custom component parsing engine to parse a tag of the custom component in the request page; further configured to select a corresponding custom component according to tag information obtained by parsing the tag of the custom component, and call a set custom component rendering engine to render the custom component; and further configured to add the rendered custom component to a corresponding position of the request page.

In addition, in another example embodiment of the client terminal according to the present disclosure, the server may add a preset identifier indicative of whether to use a custom component tag to the head of the page response content, to indicate the client terminal to process the custom component tag. In this way, it is possible to speed up rendering of the page and facilitate performance statistics or optimization or the like performed by the client terminal. Therefore, in another example embodiment of the apparatus according to the present disclosure, the second processing unit may be further configured to, load engines based on querying that the page response content has a preset identifier set by the server according to the using of the tag of the custom component in the request page, to parse and render the custom component.

The terminal application page debugging method, apparatus and client terminal provided in the present disclosure can achieve dynamic layout of a Native component on a WebView by customizing a tag of the Native component on the basis of an HTML page. An operator can design and add a tag of a Native custom component in a web page browsed by a user, and at a page server side, information of a preset custom component is extracted, and CSS-Layout, data, events and so on are calculated to obtain parsing information of the Native custom component. In this way, if a request page initiated by the user includes a tag of the custom component, the page server may set an identifier on a page response content of the request page. Correspondingly, if the client terminal WebView finds the identifier after opening the HTML page, a Native component parsing engine may be injected to complete parsing of CSS-Layout, data, events and other information. Then, a platform related rendering engine module may be called to render the Native component at the client terminal, and the rendered component may be directly added to the original WebView, to complete dynamic layout of the Native component of the request page. The implementation solution of the present disclosure can achieve adding a tag of a Native component on the HTML page and replacing the original tag of the HTML with a Native rendered component on the page browsed by the user, thus achieving better page dynamic layout practice while maintaining non-intrusion into the WebView, so that the HTML language based page component dynamic layout can greatly improve the convenience of the operator.

Although the content of the present disclosure mentions descriptions about information definition, data processing, information exchange and the like, such as customizing a Native component, extracting the tag information of the component, parsing and rendering the page or component, the present disclosure is not limited to a complete standard or the mentioned situations of information definition, data processing, and information exchange. The above descriptions involved in each example embodiment of the present disclosure are merely applications of some example embodiments of the present disclosure, and implementations slightly modified on the basis of some standards and methods may also implement the solution of each example embodiment of the present disclosure. Certainly, other non-creative transformations in line with the steps of the processing methods in each example embodiment of the present disclosure can still implement the same application, which are no longer repeated herein.

Although the present disclosure provides operation steps of the method as described in the example embodiment or the flowchart, more or fewer operation steps may be included based on conventional or non-creative efforts. The step sequence listed in the example embodiment is merely one manner among multiple step execution sequences, and does not represent the unique execution sequence. During execution of an actual device or client terminal product, the steps may be executed sequentially or executed in parallel (for example, in a parallel processor environment or multi-thread processing environment) according to the method sequence shown in the example embodiment or the figure.

The apparatus, units or modules illustrated in the foregoing example embodiment may be specifically implemented by a computer chip or an entity, or implemented by a product having a particular function. For ease of description, when the apparatus is described, it is divided into various units based on functions and the units are described respectively. Functions of various modules may be implemented in one or more software and/or hardware during implementation of the present disclosure. Of course, a module implementing a certain function may also be implemented by a combination of a plurality of submodules or subunits.

The method, apparatus or modules in the present disclosure may achieve that a controller is implemented in any proper manner by means of a computer readable program code, for example, the controller may be in the form of, for example, a microprocessor or a processor as well as a computer readable medium that stores a computer readable program code (for example, software or firmware) executable by the (micro) processor, a logic gate, a switch, an Application Specific Integrated Circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320, and a memory controller may also be implemented as a part of the control logic of the memory. Those skilled in the art are also aware that, in addition to implementing the controller by means of pure computer readable program code, it is totally feasible to logically program the method steps such that the controller implements the same function in forms of a logic gate, a switch, an application specific integrated circuit, a programmable logic controller, an embedded microcontroller, and the like. Therefore, such a controller may be regarded as a kind of hardware component, and the apparatus included therein for implementing various functions may also be regarded as a structure inside the hardware component. Alternatively, the apparatus for implementing various functions may even be regarded as not only software modules for implementing a method but also the structure in the hardware component.

Some modules in the apparatus according to the present disclosure may be described in a general context, such as a program module, of a computer executable instruction executed by a computer. Generally, the program module includes a routine, a program, an object, an element, a data structure, a class, and the like for executing a specific task or implementing a specific abstract data type. The present disclosure may also be practiced in distributed computing environments, and in these distributed computing environments, tasks are executed by a remote processing device that is connected through a communications network. In the distributed computing environments, the program module may be located in local and remote computer storage media including a storage device.

Through the foregoing description about the implementations, those skilled in the art can clearly understand that the present disclosure may be implemented by software plus a necessary hardware. Based on such an understanding, the technical solutions of the present disclosure essentially, or the part contributing to the conventional techniques may be embodied in the form of a software product, and may also be embodied through an implementation process of data migration. The computer software product may be stored in a storage medium, such as an ROM/RAM, a magnetic disk, or an optical disc, and includes several instructions for instructing a computer device (which may be a personal computer, a mobile terminal, a server, a network device, or the like) to perform the method in each example embodiment or some parts of the example embodiment of the present disclosure.

The example embodiments in this specification are described in a progressive manner, for same or similar parts in the example embodiments, reference may be made to each other, and each example embodiment focuses on a difference from other example embodiments. The present disclosure may be completely or partially applied to a lot of general-purpose or special-purpose computer system environments or configurations, for example, a personal computer, a server computer, a handheld device or portable device, a tablet device, a mobile communication terminal, a multi-processor system, a microprocessor-based system, a programmable electronic device, a network PC, a minicomputer, a mainframe computer, a distributed computing environment including any foregoing system or device, and the like.

Although the present disclosure has been depicted through example embodiments, those of ordinary skill in the art should know that the present disclosure has many variations and modifications without departing from the spirit of the present disclosure, and it is desired that the appended claims include these variations and modifications without departing from the spirit of the present disclosure.

What is claimed is:

1. A method comprising:
    initiating, by a client terminal, a page content request to a server;
    opening the request page based on a received page response content returned by the server;
    querying whether there is a preset identifier in the page response content;
    loading a set custom component parsing engine to parse a tag of a custom component in the request page in response to determining that there is the preset identifier in the page response content;
    selecting a corresponding custom component according to tag information obtained by parsing the tag of the custom component;
    calling a set custom component rendering engine to render the custom component; and
    replacing the tag of the custom component in the request page with the rendered custom component.

2. The method of claim 1, further comprising:
    determining, by the server, that the request page includes a tag of a custom component upon receipt of the page content request.

3. The method of claim 2, further comprising:
    setting the preset identifier in the page response content returned to the client terminal in response to determining that the request page includes the tag of the custom component.

4. The method of claim 1, wherein the parsing the tag of the custom component in the request page includes:
    extracting information of the tag of the custom component in the request page.

5. The method of claim 1, wherein the parsing the tag of the custom component in the request page further includes:
    determining the set custom component rendering engine corresponding to the tag information according to the extracted information.

6. The method of claim 1, wherein the triggered request page is an HTML page of a terminal application.

7. The method of claim 6, wherein the custom component includes a Native component.

8. The method of claim 7, wherein the set custom component parsing engine includes a Native component parsing engine core.js.

9. A method comprising:
    sending parsing information of a user-defined set custom component to a custom component parsing engine of a client terminal;
    determining that a tag of a custom component to be replaced is used in a request page of the client terminal; and
    returning a corresponding page response content according to a received page content request of the client terminal.

10. The method of claim 9, wherein the returning the corresponding page response content according to the received page content request of the client terminal further includes:
    setting a preset identifier in the page response content returned to the client terminal.

11. The method of claim 9, wherein the request page is an HTML page of a terminal application.

12. The method of claim 11, wherein the custom component includes a Native component.

13. The apparatus of claim 12, wherein the custom component parsing engine includes a Native component parsing engine core.js.

14. An apparatus comprising:
    one or more processors;
    a memory coupled to the one or more processors, the memory storing a plurality of executable modules, executable by the one or more processors, the plurality of modules including
        a page request module configured to initiate a page content request to a server based on a triggered request page;
        a receiving and processing module configured to receive a page response content returned by the server, open the request page according to the page response content, and query whether there is a preset identifier in the page response content;
        a page parsing module configured to, in response to determining that there is a preset identifier in the page response content, load a set custom component parsing engine to parse a tag of a custom component in the request page;
        a page rendering module configured to select a corresponding custom component according to tag information obtained by parsing the tag of the custom component, and call a set custom component rendering engine to render the custom component; and
        a dynamic layout module configured to replace the tag of the custom component in the request page with the rendered custom component.

15. The apparatus of claim 14, wherein the page parsing module is further configured to extract information of the tag of the custom component in the request page.

16. The apparatus of claim 15, wherein the page parsing module is further configured to determine the set custom component rendering engine corresponding to the tag information according to the extracted information.

17. The apparatus of claim 14, wherein the triggered request page is an HTML page of a terminal application.

18. The apparatus of claim 17, wherein the custom component includes a Native component.

19. The apparatus of claim 18, wherein the set custom component parsing engine includes a Native component parsing engine core.js.

20. The apparatus of claim 14, wherein the server is further configured to determine the request page includes the tag of a custom component upon receipt of the page content request.

* * * * *